(12) United States Patent
Paszek et al.

(10) Patent No.: US 11,093,738 B2
(45) Date of Patent: Aug. 17, 2021

(54) SYSTEMS AND METHODS FOR DETECTING FLYING ANIMALS

(71) Applicant: Bioseco Sp. z o.o., Gdańsk (PL)

(72) Inventors: Krzysztof Paszek, Gdańsk (PL); Michal Danielowski, Gdańsk (PL)

(73) Assignee: BIOSECO SP Z.O.O, Gdansk (PL)

( * ) Notice: Subject to any disclaimer, the term of this patent is extended or adjusted under 35 U.S.C. 154(b) by 0 days.

(21) Appl. No.: 16/349,481

(22) PCT Filed: Nov. 13, 2017

(86) PCT No.: PCT/EP2017/079019
§ 371 (c)(1),
(2) Date: May 13, 2019

(87) PCT Pub. No.: WO2018/087354
PCT Pub. Date: May 17, 2018

(65) Prior Publication Data
US 2020/0257896 A1 Aug. 13, 2020

(30) Foreign Application Priority Data

Nov. 11, 2016 (GB) .................................. 1619113

(51) Int. Cl.
*G06T 7/20* (2017.01)
*G06K 9/00* (2006.01)
(Continued)

(52) U.S. Cl.
CPC ......... *G06K 9/00362* (2013.01); *A01M 29/00* (2013.01); *G01S 13/282* (2013.01);
(Continued)

(58) Field of Classification Search
CPC ........... G06K 9/00288; G06K 9/00302; G06K 9/00308; G06K 9/00248; G06K 9/00268;
(Continued)

(56) References Cited

U.S. PATENT DOCUMENTS 8,742,977 B1 * 6/2014 Piesinger .............. G01S 7/4008
342/61
2010/0201525 A1 8/2010 Bahat et al.
(Continued)

FOREIGN PATENT DOCUMENTS

| JP | 5486000 B2 | 5/2014 |
|---|---|---|
| WO | 2010/035175 A1 | 4/2010 |

(Continued)

OTHER PUBLICATIONS

European communication dated Apr. 8, 2021 for European Application No. 17 797160.3-1004.

*Primary Examiner* — Quan M Hua
(74) *Attorney, Agent, or Firm* — Browdy and Neimark, PLLC (57) ABSTRACT

A system for detecting flying animals, the system comprising: a detection module configured to detect flying animals; a local processing module associated with the detection module and configured to remove background noise from data gathered by the detection module; an analysis module configured to receive data from the local processing module and process said data to determine presence of flying animals and classify such flying animals by species; and a deterrent configured to repel one or more species of flying animal based on the classification of detected flying animals.

16 Claims, 4 Drawing Sheets

(51) Int. Cl.

| | | |
|---|---|---|
| *G06T 7/215* | (2017.01) | |
| *G06T 7/277* | (2017.01) | |
| *A01M 29/00* | (2011.01) | |
| *G01S 13/28* | (2006.01) | |
| *G01W 1/02* | (2006.01) | |
| *G06K 9/32* | (2006.01) | |
| *G06K 9/62* | (2006.01) | |
| *G06T 5/00* | (2006.01) | |
| *H04R 1/32* | (2006.01) | |

(52) U.S. Cl.
CPC .............. *G01W 1/02* (2013.01); *G06K 9/3241* (2013.01); *G06K 9/6267* (2013.01); *G06T 5/002* (2013.01); *G06T 7/215* (2017.01); *G06T 7/277* (2017.01); *H04R 1/326* (2013.01)

(58) Field of Classification Search
CPC .. G06K 9/00281; G06K 9/00315; G06K 9/00; G06K 9/38; G06K 9/00221; G06K 9/00664; G06K 2009/00322; G06K 9/00255; G06K 9/0061; G06K 9/00845; G06K 9/00906; G06K 9/2027; G06K 9/4628; G06K 9/6206; G06K 9/00362; G06K 9/00892; G06K 9/6255; G06K 9/6267; G06K 9/6293; G06T 7/0012; G06T 2207/10016; G06T 2207/20084; G06T 2207/30201; G06T 7/73; G06T 3/0093

See application file for complete search history.

(56) References Cited

U.S. PATENT DOCUMENTS

| | | | |
|---|---|---|---|
| 2013/0050400 A1 | 2/2013 | Stiesdal et al. | |
| 2014/0261151 A1* | 9/2014 | Ronning | A01M 29/10 116/22 A |
| 2015/0130618 A1* | 5/2015 | Hamminga | F03D 17/00 340/573.2 |
| 2016/0055400 A1 | 2/2016 | Jorquera et al. | |

FOREIGN PATENT DOCUMENTS

| | | |
|---|---|---|
| WO | 2015/118449 A1 | 8/2015 |
| WO | 2015/139091 A1 | 9/2015 |
| WO | 2016/028922 A1 | 2/2016 |

* cited by examiner

SYSTEMS AND METHODS FOR DETECTING FLYING ANIMALS

The present invention describes systems and methods for flying animals.

Flying animals can pose a significant threat to aircraft, wind turbines and other high value installations. A bird strike on an aircraft could result in the aircraft crashing with resulting loss of life or, as a best case scenario, could result in damage to the aircraft which requires the aircraft to be grounded while it is inspected and repaired. Similarly, a bird strike to a wind turbine blade could damage the blade rendering the wind turbine inoperable.

In addition to potential installation or aircraft damage, installation operators can be fined if found liable for injury to, or death of, particular species of birds or bats. It is also desirable to prevent injury to or death of protected species of birds or bats from a moral and environmental perspective.

It is against this background that the present invention has arisen.

SUMMARY

An aspect of the present invention provides a system for detecting, classifying and deterring birds and bats, the system comprising: a detection module configured to detect birds and/or bats; a local processing module associated with the detection module and configured to remove background noise from data gathered by the detection module; an analysis module configured to receive data from the local processing module and process said data to determine presence of birds and/or bats and classify such birds and/or bats by species; and a deterrent configured to repel one or more species of bird/and or bat based on the classification of detected birds and/or bats.

Local processing of recorded data to generate a targeted subset of data reduces the transmission time for sending core data for analysis by a centralised analysis unit. The claimed configuration enables multiple data streams to be collected and processed in real time to detect, classify and deter birds and/or bats from a target area.

The system is capable of detecting objects flying up to 200 metres away from each detection module within a target environment. Larger objects (such as birds having a wingspan>1 metre) can be detected up to 400 metres away from a detection module. Tests have shown the system to be capable of detecting up to 90% of birds during daylight with an 80% accuracy of flight path prediction at a range of 100 metres from a target object. The system has also been tested to show that only 2-3 false positive detections are encountered per day (based on a yearly average).

A further aspect of the invention provides a method of detecting objects in real time image data, the method comprising: i) capturing at least two image streams of an environment; ii) converting each associated frame from each image stream into binary form; iii) comparing associated binary frames from each image stream to identify non-environmental objects; iv) applying thresholding to each frame to divide data into segments; and v) determining the size and two dimensional position of each non-environmental object.

A further aspect of the invention provides a method of classifying objects in real time image data, the method comprising: i) combining a plurality of time coded image frames to derive a composite image; ii) using the composite image to determine Cartesian coordinates for one or more non-environmental objects; iii) grouping individual non-environmental objects; iv) applying Kalman filtering to each group of non-environmental objects; v) classifying each non-environmental object by animal species; vi) predicting object flight paths; and vii) providing a probability of collision with a pre-determined target.

A further aspect of the invention provides a method of predicting bird or bat flight paths, the method comprising: i) comparing an instantaneous subset of data for an identified bird or bat species against a stored subset of data for the same bird or bat species; ii) extracting flight path data from the stored subset of data; iii) extrapolating flight path data from the instantaneous subset data based on flight path data from the stored subset of data; and iv) generating on ore more flight path predictions.

A further aspect of the invention provides a system for detecting, classifying and deterring birds and/or bats, the system comprising: a detection module configured to detect flying objects entering a first detection zone; an analysis module for determining whether a flying object within the first detection zone is a bird or a bat; and a first deterrent configured to activate following determination that a flying object within the first detection zone is bird or a bat and said bird or bat enters a second detection zone, wherein the second detection zone is closer to a pre-determined reference point than the first detection zone.

Such a system is optimised to detect and classify flying objects at a distance from a pre-determined reference point or object of interest. By the time the object approaches the second detection zone the system will have determined whether the flying object is an animal, i.e. or a bird or bat. If the object is determined to be an animal and the animal enter the second detection zone a deterrent is activated. By determining whether the object is animal while the animal is in the first detection zone, false positives are reduced and the deterrent is only activated when required to deter an animal away from the pre-determined reference point. By only activating the deterrent when required unnecessary nuisance to neighbours near the pre-determined reference point is minimised.

The system may further comprise a third detection zone that is closer to the pre-determined reference point than the first detection zone and the second detection zone.

The system may further comprise a second deterrent operable to activate upon approach to the third detection zone by a bird or a bat.

The first deterrent may be visual and the second deterrent may be audible.

Use of a visual deterrent prior to an audible deterrent is advantageous as a visual deterrent is likely to be less intrusive to neighbours than an audible deterrent. The audible deterrent is activated as a last resort to deter animals that have not been deterred by the visual deterrent.

The first detection zone may be 500-1000 metres from the pre-determined reference point.

The second detection zone may be 250-500 metres from the pre-determined reference point. The third detection zone may be less than 250 metres from the pre-determined reference point.

FIGURES

The invention will now be described by way of reference to the following figures.

DESCRIPTION

Figure 1:
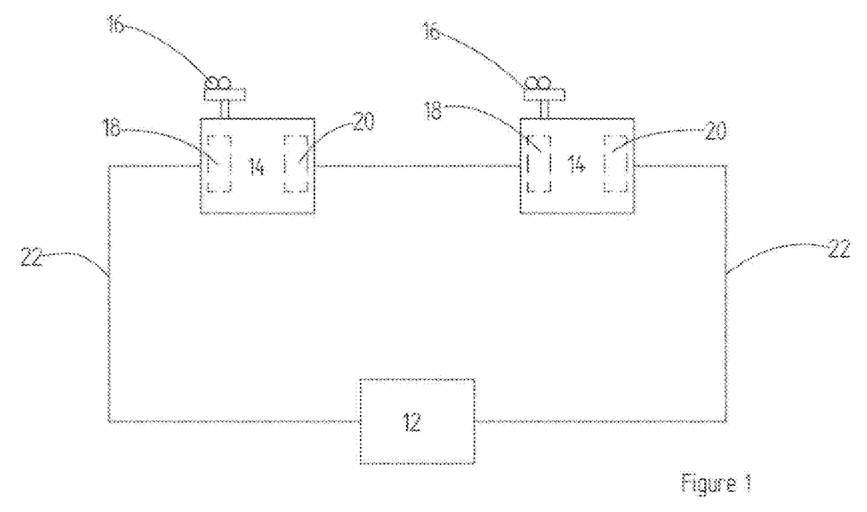
FIG. 1 shows a simplified view of a system according to embodiments of the invention.

A simplified version of a system 10 according to the present invention is shown in FIG. 1. The system comprises a master unit 12 to which one or more pair of slave units 14 are in communication with. Slave units 14 are arranged in pairs with each pair defining a detection module. Each slave unit 14 comprises a movement detector 16 configured to detect and record movement in a target environment, a central processing unit (CPU) or microprocessor 18 for processing recorded data and a memory 20 for storing both recorded and processed data. Each slave unit is connected to the master unit by appropriate communication means 22 such as Ethernet, WIFI, Bluetooth® or GSM. Each movement detector associated 16 with a slave unit 14 is focused on the same surveillance area around an object of interest.

Figure 2:
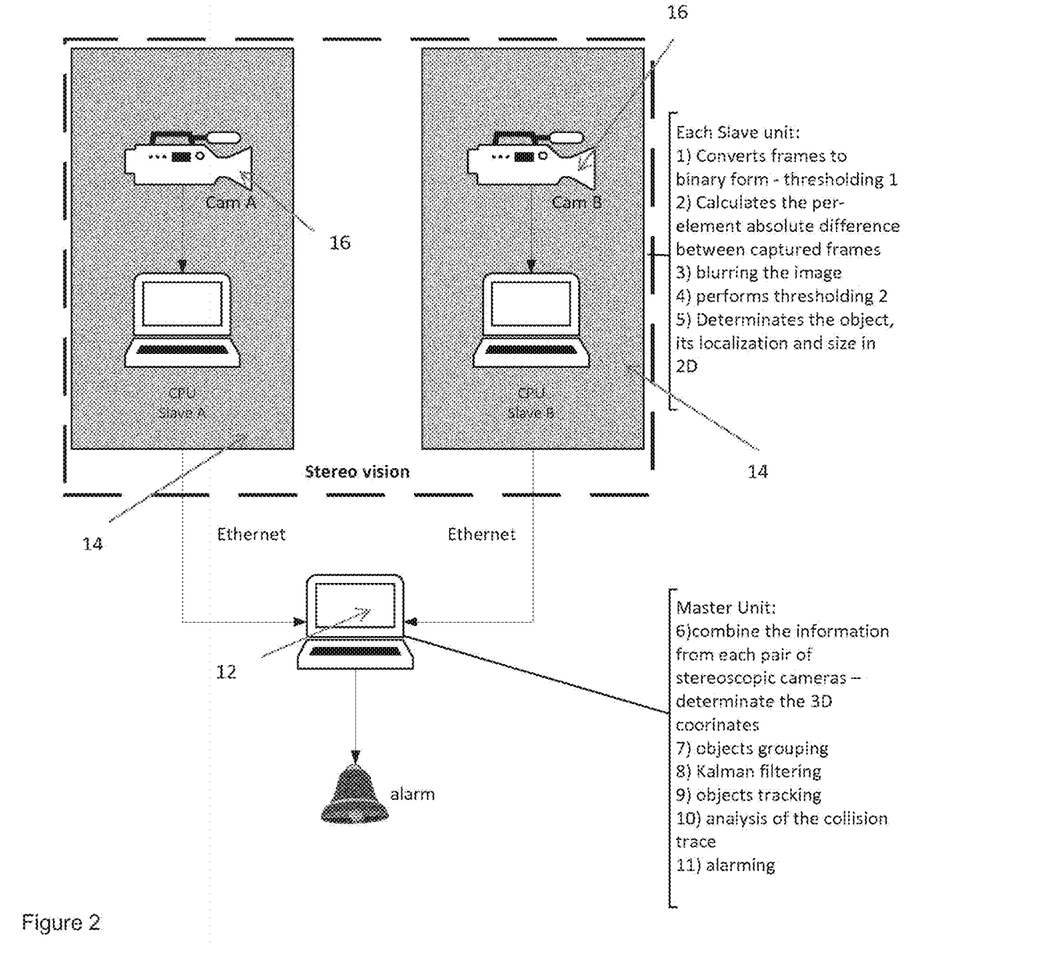
FIG. 2 shows a camera based system according to embodiments of the invention.

In the embodiment illustrated in FIG. 2, each movement detector 16 includes a camera which could be, directional cameras, spherical cameras, thermal cameras, or a combination thereof. Each camera records image data relating to the same target area. Recorded image data is stored in the memory 20 associated with each respective slave unit 14 and processed by the CPU or microprocessor 18 to convert each frame of the image data into binary format. Each binary image is split into pixels that either have a white value or a black value. A first thresholding process is used to identify whether each pixel should be set as white or black. Each slave unit 14 utilises dedicated software to process image frames recorded by the associated camera 16.

The binary image data from each slave unit 14 is compared to identify any differences between captured frames. Thresholding is then applied to each frame to segment the binary image. Any constant background elements are blurred and thresholding is applied again to each frame to clearly identify just that portion of each frame that is of interest. In other words, as the number of frames stored in relation to each recording is n>2 or n=2, the absolute difference value between the frames can be calculated to ensure that only moving objects within the captured frames are retained for further analysis. The resulting image is then blurred using Gaussian blur or Gaussian smoothing to remove any discontinuities entered into the image by the first thresholding process. A second thresholding step is then applied to remove unwanted noise from the resulting image and to reduce the number of details that do not relate to moving objects.

A contour is applied to the image following completion of the second thresholding step. The contour is analysed by the slave unit to determine whether the contour size measured in pixels falls between upper and lower pixel thresholds. If the contour size is less than a lower threshold or higher than upper threshold, the image is not analysed further as the object is assumed by the system not to be a bat or a bird. Provided that the contour size is between the lower and upper thresholds, the localisation of the object is calculated using the centroid method. The centroid of an image (object contour) X is calculated by well-known image moment method. Centroid:

$$\{\bar{x}, \bar{y}\} = \left\{\frac{M_{10}}{M_{00}}, \frac{M_{01}}{M_{00}}\right\}$$

Central moments of digital image f(x,y) are defined as:

$$M_{ij} = \sum_x \sum_y x^i x^j I(x, y)$$

The calculated contour size of the object and its position are then sent to the master unit for further processing.

The master unit 12 combines data received from each of the pair of slave units 14 associated with a detection module. The combined data is analysed to remove all non-bird/bat objects. The master unit 12 determines the contour size, velocity, position and x, y, z co-ordinates of an object using the 3D Cartesian system. 3D co-ordinates are determined by using the 2D image data sent from the pair of slave units 14 and analysing the absolute difference between the position of the detected object as identified in the 2D image data. All objects identified in the 2D image data are grouped based on the mean square error (mse) between positions:

mse=½($y_a$−$y_b$)+½($x_a$−$x_b$)

and their true positions are calculated using a Kalman filter applied to a plurality of frames recorded over a period of time. Where a and b in the equation defines the frames from each of a pair of slave units 14.

The analysed data is used to calculate a predicted flight path of each recorded bird/bat object and to calculate the probability of a collision with an object of interest, i.e. aircraft, wind turbine or other high value installation. In the event that a bird/bad object is determined to be likely to collide with an object of interest or enter a pre-determined target zone the master unit is configured to automatically trigger an alarm to warn of the risk of a bird/bat strike and/or deploy deterrent countermeasures to repulse birds/bats in the vicinity away from the object of interest.

All recorded data relating to birds/bats is stored in a centralized data base along with calculated flight paths, time of day and other relevant information such as audio recordings.

The stored data is used to classify the type of bird/bat that has been recorded by species. This classification is used to select an appropriate deterrent countermeasure for the type of bird/bat recorded. The stored data is also used to improve the accuracy of flight path prediction and collision probability calculations by applying an appropriate algorithm to a sub-set of data relating to a particular bird/bat species.

To minimise errors in calculated position and to predict the flight path of a bird/bat object, an extended Kalman filter combined with a neural network is used. The following algorithm is used to predict the flight path of a bird/bat object:

Where:

x,y—Cartesian coordinated determined by the cameras r, θ—polar coordinates of the detected object.

The Jacobian of the measurement equation:

$$\hat{x}(k+1) = \begin{bmatrix} \hat{x}_{pos}(k+1) \\ \hat{x}_{vel}(k+1) \\ \hat{y}_{pos}(k+1) \\ \hat{x}_{vel}(k+1) \end{bmatrix} = \begin{bmatrix} 1 & dt & 0 & 0 \\ 0 & 1 & 0 & 0 \\ 0 & 0 & 1 & dt \\ 0 & 0 & 0 & 1 \end{bmatrix} \begin{bmatrix} \hat{x}_{pos}(k) \\ \hat{x}_{vel}(k) \\ \hat{y}_{pos}(k) \\ \hat{x}_{vel}(k) \end{bmatrix} = F\hat{x}(k)$$

The measurement update equation:

$$\hat{m}_k = \begin{bmatrix} \hat{r}_k \\ \hat{\theta}_k \end{bmatrix} = \begin{bmatrix} \sqrt{\hat{x}_{pos}^2 + \hat{y}_{pos}^2} \\ a\tan2(\hat{y}_{pos}/\hat{x}_{pos}) \end{bmatrix}$$

Jacobian matrix:

$$H_k = \left.\frac{\partial(\overline{m_k})}{\partial \hat{x}}\right|_x = \begin{bmatrix} \cos(\hat{\theta}_k) & 0 & \sin(\hat{\theta}_k) & 0 \\ -\sin(\hat{\theta}_k)/\hat{r}_k & 0 & \cos(\hat{\theta}_k)/\hat{r}_k & 0 \end{bmatrix}$$

Figure 3:
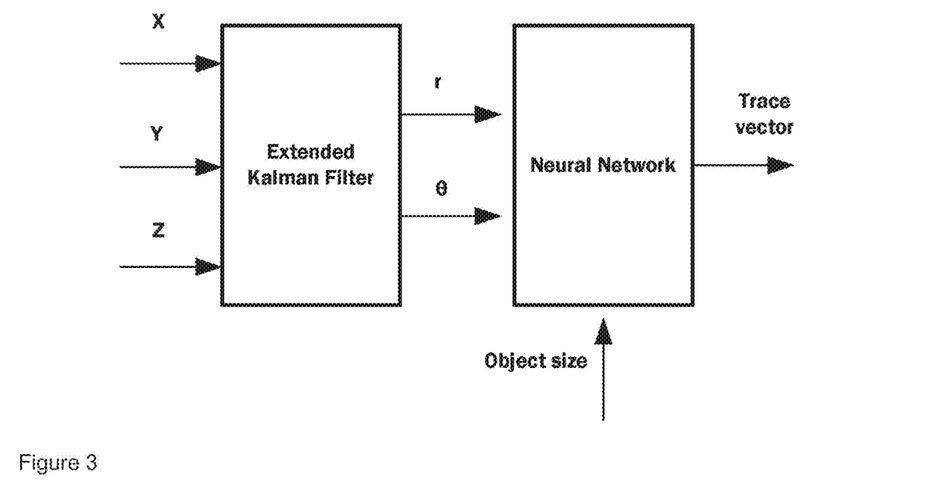
FIG. 3 illustrates an embodiment of the invention utilising a Kalman filter and an artificial neural network.
Figure 4:
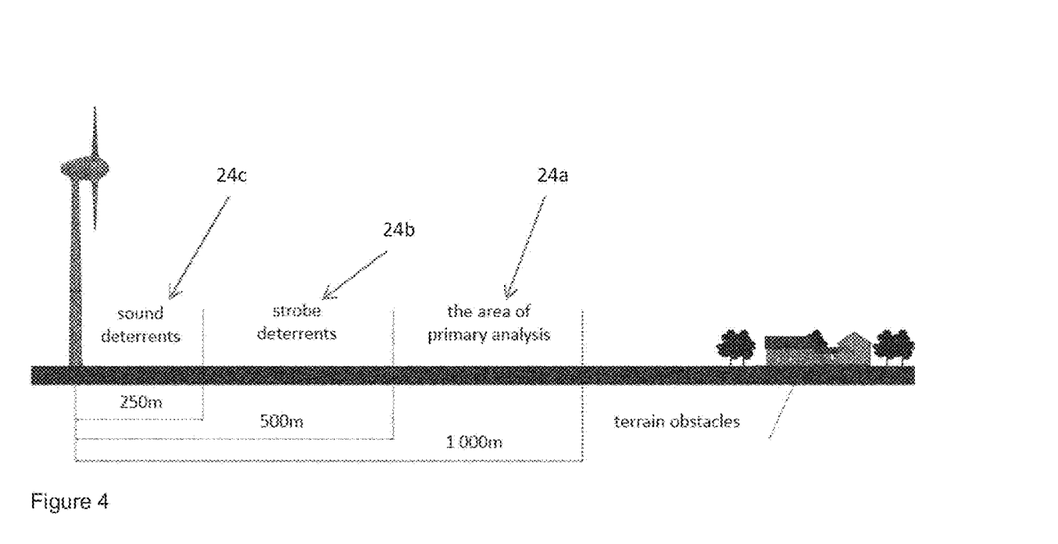
FIG. 4 illustrates a particular embodiment of the invention of FIGS. 1 and 2.

In the FIG. 3 the combination of Kalman filter with the artificial neural network is presented. The determined polar coordinates r, θ from a number of previous positions of the object are applied to artificial feedforward neural network (ANN) of twenty five neurons in a first layer and ten in a second layer. The task of ANN is to predict the trace vector of the bird in the range of the detection zone 24. The accuracy and precision of the prediction of the bird trace depends on the number of previous points applied to the network and increases with observation time. The neural network is additionally supplied with information about size and/or velocity of the detected object. During the first week of the system work the neural network weights and biases are tuned with a Levenberg-Marquardt backpropagation algorithm (trainlm) to adopt to the behavior of particular sapiens occurring in a given geographical area. As shown in FIG. 4, the detection zone comprises a first detection zone 24a approximately 500-1000 metres from an object of interest. When a flying object enters the first detection zone 24a the system determines whether the flying object is a bird or bat, as described above, and its relative size, position and predicted flight path. As the bird or bat enters the second detection zone 24b the system activates a first deterrent which may be a visual deterrent such as strobe lights. If the bird or bat then subsequently enters a third detection zone 24c which is less than 250 metres from the object of interest the system activates a second deterrent which may be an audible deterrent such as a siren.

While the invention has been described with reference to the slave units 14 each comprising a movement detector 16 which is a camera, it will be appreciated that other devices may be used as movement detectors, in particular radar or acoustic devices. Doppler radar, noise radar or frequency modulated continuous wave radar devices or directional microphone or ultrasound recorder devices could be used in place of one or more of the cameras of a slave unit 14.

Multiple detection modules comprising a combination of cameras, radar and acoustic devices may be connected to the master unit 12. In one example, a detection unit comprises two slave units 14 with each slave unit 14 comprising a stereoscopic camera for calculating size and 2D position of an object. In another embodiment one slave unit 14 comprises a stereoscopic camera and the other slave unit comprises a radar unit for detecting height of an object or at least one acoustic device for recording bird/bat calls to assist in classification of objects.

In order to improve local analysis of recorded data by each slave unit 14, an environmental monitoring module may be associated with each slave unit. The environmental monitoring module comprises a number of different sensors for monitoring environmental factors such as temperature, humidity, wind direction, wind speed, atmospheric pressure, precipitation volume, atmospheric gas content, for example. Each of these factors is accounted for by the software that processes recorded data to more accurately calculate the size and position of recorded objects.

The ability of each slave unit 14 to communicate with the master unit is critical for real-time detection, classification and deterrence of bird/bat objects. To protect against communication failure, each slave unit 14 communicates with the master unit 12 using several communication protocols including: GPS, radio/satellite, wireline communication, IR illumination, Ethernet or GSM, for example.

For a wind turbine application, detection modules and environmental sensors are placed on each turbine to provide protection for an entire wind farm installation. Upon detection of a flying object by a detection module, the associated data is processed to calculate the size and position of the object in two dimensions. The resulting data is sent to the master unit 12 for object classification and analysis of Cartesian position and predicted flight path. The position and predicted flight path are used to calculate probability of collision with the wind turbine blades. If the detected object is classified as a protected species of bird or bat, the master unit either instructs the wind turbine blades to slow or stop or emits a deterrent to encourage specific species of bird or bat to move away from the wind turbine.

For an airport installation, detection modules and environmental sensors are placed around the airport such that at least one detection module covers each segment of airspace surrounding the airport. Upon detection of a flying object by a detection module, the associated data is processed to calculate the size and position of the object in two dimensions. The resulting data is sent to the master unit 12 for object classification and analysis of Cartesian position and predicted flight path. The position and predicted flightpath are used to calculate probability of collision with an aircraft or ground installation or probability of the object entering a pre-determined airspace. The master unit 12 is configured to generate an alarm to alert ground control of bird/bat strike threat and to deploy deterrent countermeasures to repulse birds/bats from the area.

Figure 5:
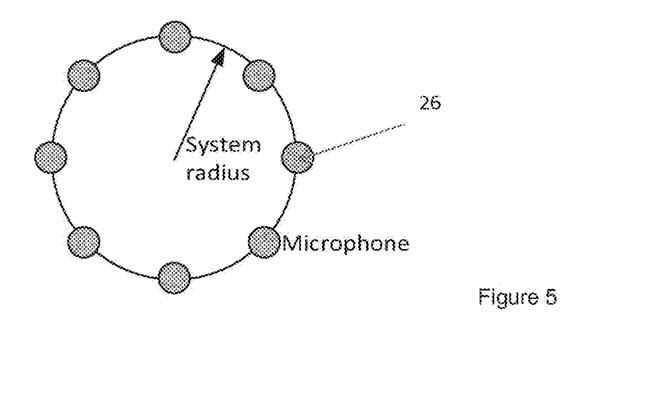
FIG. 5 illustrates a system for detecting bats.

In relation to a system for detecting bats as shown in FIG. 5, the movement detector is a sound sensor for measuring an ultrasonic signal emitted by bats during flight. Such a system comprises a plurality of ultrasonic sensors 26 placed around each slave unit, typically spaced apart around a one metre perimeter. The recorded ultrasonic signal is sampled at a frequency of 250 kHz and 16 bit resolution. The frequency spectrum is determined by the Fourier Transform on the 100 ms time window.

Each slave unit 14 is equipped with relevant sound sensor. The data is processed in real-time by the slave unit 14 (simultaneously with the image analysis). To the master unit 12 only information about particular frequencies occurring in the signal is transferred. If the bat detection is confirmed by the number of observations, the signal in time domain is transferred to the master unit 12 in order to calculate the actual bat position. The position is calculated basing on the phase shift between the signal and time difference of arrival.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. An automatic system for detecting, classifying and determining a position of flying animals based on real time image data processing of data in at least first, second and third detection zones, wherein the at least first, second and third detection zones are defined with respect to a predetermined reference point positioned at a location of a turbine, wherein the third detection zone is closest to the predetermined reference point, the first detection zone is furthest from the predetermined reference point, and the second detection zone is between the first and third detection zones, the system comprising:
- a detection module configured to detect the flying animals and comprising at least a first movement recorder and a second movement recorder for collecting data representing the flying animals;
- a local processor associated with the detection module and configured to remove background noise from the data gathered by the detection module and detect coordinates of objects in an image plane;
- an analysis module configured to receive data of the object coordinates from the local processor and analyze said data to detect a presence of flying animals in one of the first, second, or third detection zones and classify the flying animals by species and/or size;
- a cascade deterrence system, where particular actions are implemented based on the size and the position of the detected flying animal, and possible actions are selected from activating a strobe light deterrent or an audio deterrent or stopping of the turbine disposed at the predetermined reference point, and combinations thereof; and
- a deterrent configured and activated to repel one or more species of flying animal based on the classification and position of detected flying animals,
- wherein the system activates the deterrent depending on the presence of the detected flying animal in the second detection zone, such that a first deterrent is activated when the flying animal is detected within the second detection zone and a second deterrent is activated when the flying animal is detected within the third detection zone.

2. The automatic system according to claim 1, wherein a memory is associated with each of the first movement recorder and second movement recorder and is configured to store movement data detected by the first movement recorder and second movement recorder.

3. The automatic system according to claim 1, wherein at least one of the first movement recorder and/or second movement recorder is a camera, said camera selected from a directional camera, spherical camera or thermal camera.

4. The automatic system according to claim 1, wherein at least one of the first movement recorder and/or second movement recorder is a radar, said radar selected from a Doppler radar, noise radar or frequency modulated continuous wave radar.

5. The automatic system according to claim 1, wherein at least one of the first movement recorder and/or second movement recorder is an acoustic device selected from a directional microphone or an ultrasound recorder.

6. The automatic system according to claim 1, wherein the local processor is further configured to compare data recorded by the first movement recorder and data recorded by the second movement recorder to identify constant background noise.

7. The automatic system according to claim 6, wherein the local processor is further configured to apply thresholding to the data recorded by the first movement recorder and the data recorded by the second movement recorder to segment the data from blur background noise.

8. The automatic system according to claim 1, wherein the local processing module is further configured to calculate the size of an object and the position of the object in two-dimensional space.

9. An automatic method of detecting, classifying and determining a position of in real time image data in the first, second, and third detection zones using the automatic system of claim 1, the method comprising:
   i) capturing, using the detection module, at least two image streams of an environment;
   ii) converting, using the local processor, plurality of associated frames from each of the at least two image streams into binary form;
   iii) comparing, using the local processor, associated binary frames from each of the at least two image streams to identify non-environmental objects;
   iv) applying, using the local processor, thresholding to each of the associated binary frames to divide data in the binary frame into segments; and
   v) determining, using the local processor, a size and a two-dimensional position of each non-environmental object identified in the environment,
   wherein said system further comprises a central processing unit configured to:
   a) combine a plurality of time coded image frames to derive a composite image;
   b) use the composite object coordinates to determine Cartesian coordinates for detected objects;
   c) group individual non-environmental objects;
   d) apply Kalman filtering to each group of non-environmental objects;
   e) classify each non-environmental object by animal species;
   f) predict flight paths for each non-environmental object; and
   g) provide a probability of collision of each non-environmental object with a target object located at the predetermined reference point.

10. The automatic method according to claim 9, the method comprising the further steps of:
    viii) generating an alarm if the probability of collision is greater than 80%; and
    ix) deploying at least one of the first or second deterrents to repulse the classified animal species.

11. The automatic method of claim 9, wherein when the animal species is a bird or bat, the predicting flight paths comprises:
    i) comparing an instantaneous subset of data for an identified animal species against a stored subset of data for the identified animal species;
    ii) extracting flight path data from the stored subset of data;
    iii) extrapolating flight path data from the instantaneous subset data based on flight path data from the stored subset of data;
    iv) generating one or more flight path predictions; and
    v) optionally, predicting a probability of collision of the animal with the target object.

12. The automatic system of claim 1,
    wherein the at least a first movement recorder and a second movement recorder comprise two or more image capturing devices;
    wherein the local processor is further configured to compare and convert image frames captured by the two or more image capturing devices into binary format and determine an approximate size and two-dimensional position of objects of interest;

wherein the system further comprises a central processor for determining three dimensional coordinates and a predicted trajectory of the objects of interest and for classifying the objects of interest based on size, appearance and other identifying features; and wherein the deterrent module is configured to deploy the deterrent according to the object classification.

13. The automatic system according to claim 12 further comprising a radar for calculating the height of an object.

14. The automatic system according to claim 12 further comprising one or more environmental sensors for measuring environmental conditions, wherein said one or more environmental sensors are selected from one of or a combination of temperature sensors, humidity sensors, wind direction sensors, wind speed sensors, atmospheric pressure sensors, precipitation sensors or gas analyzers.

15. The automatic system according to claim 1, wherein the third detection zone that is closer to the predetermined reference point than the first detection zone and the second detection zone.

16. The automatic system according to claim 1, wherein the second detection zone that is closer to the predetermined reference point than the first detection zone.

* * * * *